US008451717B2

(12) United States Patent
Venkataraman et al.

(10) Patent No.: US 8,451,717 B2
(45) Date of Patent: May 28, 2013

(54) METHOD AND APPARATUS FOR RAPID SWITCHOVER FROM PRIMARY TO STANDBY MULTICAST TREES

(75) Inventors: Srikrishnan Venkataraman, Santa Clara, CA (US); Sivaramakrishna Kuditipudi, Milpitas, CA (US); Prashanth Ishwar, Santa Clara, CA (US); Pradeep G. Jain, Sunnyvale, CA (US); Jeremy Fine, Mountain View, CA (US); Will Lockhart, Cambridge (GB)

(73) Assignee: Alcatel Lucent, Paris (FR)

( * ) Notice: Subject to any disclaimer, the term of this patent is extended or adjusted under 35 U.S.C. 154(b) by 356 days.

(21) Appl. No.: 12/847,250

(22) Filed: Jul. 30, 2010

(65) Prior Publication Data

US 2012/0026866 A1  Feb. 2, 2012

(51) Int. Cl.
*G06F 11/00* (2006.01)
(52) U.S. Cl.
USPC .......................................................... 370/225
(58) Field of Classification Search
USPC .................................. 370/225, 216, 217, 218
See application file for complete search history.

(56) References Cited

U.S. PATENT DOCUMENTS

| 6,853,641 | B2 * | 2/2005 | Lindhorst-Ko et al. | ....... 370/394 |
| 7,835,378 | B2 * | 11/2010 | Wijnands et al. | ............. 370/408 |
| 2007/0177525 | A1 * | 8/2007 | Wijnands et al. | ............. 370/254 |
| 2007/0268899 | A1 | 11/2007 | Cankaya | |
| 2011/0158128 | A1 | 6/2011 | Bejerano et al. | |

OTHER PUBLICATIONS

International Search Report and the Written Opinion of the International Searching Authority, or the Declaration in PCT/US2011/043491, Alcatel-Lucent USA Inc., Applicant, mailed Sep. 15, 2011, 17 pages.

(Continued)

*Primary Examiner* — Mark Rinehart
*Assistant Examiner* — Mohammad Anwar
(74) *Attorney, Agent, or Firm* — Wall & Tong, LLP (57) ABSTRACT

A capability is provided for switching between primary and standby multicast trees on a network egress node of a multicast network. The network egress node includes a first MPLS LABEL Record including a first tree identifier of the first multicast tree, a second MPLS LABEL Record including a second tree identifier of the second multicast tree, and a MULTICAST Record including a plurality of primary tree identifiers and a plurality of standby tree identifiers. The MPLS LABEL Records include parameters, respectively, where the values of the parameters are indicative of respective packet processing rules to be applied for determining whether to accept or discard packets. When the parameter of an MPLS LABEL Record is set to a first value, a determination as to whether to accept or discard a packet received via the associated multicast tree is performed by comparing the tree identifier of the MPLS LABEL Record only to primary tree identifiers of the MULTICAST Record. When the parameter of an MPLS LABEL Record is set to a second value, a determination as to whether to accept or discard a packet received via the associated multicast tree is performed by comparing the tree identifier of the MPLS LABEL Record to primary tree identifiers of the MULTICAST Record or standby tree identifiers of the MULTICAST Record.

18 Claims, 6 Drawing Sheets

OTHER PUBLICATIONS

Faloutsos M et al: "An architecture for scalabel efficient, and fast fault-tolerant multicast provisioning," IEEE Network, IEEE Service Center, New York, NY, US, vol. 18, No. 2, Mar. 1, 2004, pp. 26-34, XP011109500, ISSN: 0890-8044, DOI: 10.1109/MNEET.2004. 1276608 p. 27, paragraph—p. 29, paragraph Best Effort vs. MPLS Fault Tolerance; figure 1, p. 2; p. 29, paragraph How Aggregated Multicast Facilitates Fault-Toleran—p. 30, paragraph Structure and Functions of AMFM; figure 3; p. 31, paragraph Failure Recovery—p. 32, paragraph Failure Recovery.

Huang Weili et al: "A Fault-Tolerant Strategy for Multicasting in MPLS Networks," Computer Engineering and Technology, 2009. ICCET '08. International Conference on, IEEE, Piscataway, NJ, USA, Jan. 22, 2009, pp. 432-435, XP031415101, DOI: 10.1109/ICCET.2009.138 ISBN: 978-1-4244-3334-6, p. 432, paragraph I. Introduction—p. 434, paragraph A. Construction and Destruction of Multicast Tree; figure 1 p. 434, paragraph D. Better robustness.

* cited by examiner

FIG. 6 ional to the number of channel records in the MULTICAST Record.

METHOD AND APPARATUS FOR RAPID SWITCHOVER FROM PRIMARY TO STANDBY MULTICAST TREES

FIELD OF THE INVENTION

The invention relates generally to communication networks and, more specifically but not exclusively, to switching between multicast trees in multicast communication networks.

BACKGROUND

As demand for multicast services continues to grow, service providers continue to seek low-cost, bandwidth-efficient, and fault-resilient multicast transport capabilities for supporting multicast services. Multi-Protocol Label Switching (MPLS) enables efficient delivery of a wide variety of differentiated, end-to-end services using label switched paths (LSPs). In many MPLS networks, Point-to-Multipoint (P2MP) trees are used for supporting multicast streams transporting various services. In such networks, the network egress node, from which multicast streams exit the MPLS network, receives packets via two P2MP LSP trees, namely, a primary P2MP LSP tree and a standby P2MP LSP tree. The network egress node accepts packets from the primary P2MP LSP tree until it fails, at which time the network egress node switches to accepting packets from the standby P2MP LSP tree until the primary P2MP LSP tree is restored.

Disadvantageously, however, existing multicast tree switching mechanisms on network egress nodes are not fast enough. In existing network egress nodes, the forwarding engine of the network egress node includes MPLS LABEL Records and a MULTICAST Record, and the existing multicast tree switching mechanism on the existing network egress node requires all of the channel records of the MUSTICAST Record of the network egress node to be reprogrammed, after failure of the primary P2MP LSP tree, before traffic may be accepted via the standby P2MP LSP tree. As a result, for a MULTICAST Record having n channel records, reprogramming of the MULTICAST Record is an order O(n) operation, which may result in a fair amount of traffic loss to complete. Thus, in existing network egress nodes, traffic is lost when the network egress nodes switch between primary and standby multicast trees, which may be unacceptable under service level agreement (SLAs) or in terms of subscriber quality of experience.

SUMMARY

A capability is provided for switching between primary and standby multicast trees on a network egress node of a multicast network. The network egress node includes a first MPLS LABEL Record including a first tree identifier of the first multicast tree, a second MPLS LABEL Record including a second tree identifier of the second multicast tree, and a MULTICAST Record including a plurality of primary tree identifiers and a plurality of standby tree identifiers. The MPLS LABEL Records include parameters, respectively, where the values of the parameters are indicative of respective packet processing rules to be applied for determining whether to accept or discard packets. When the parameter of an MPLS LABEL Record is set to a first value, a determination as to whether to accept or discard a packet received via the associated multicast tree is performed by comparing the tree identifier of the MPLS LABEL Record only to primary tree identifiers of the MULTICAST Record. When the parameter of an MPLS LABEL Record is set to a second value, a determination as to whether to accept or discard a packet received via the associated multicast tree is performed by comparing the tree identifier of the MPLS LABEL Record to primary tree identifiers of the MULTICAST Record or standby tree identifiers of the MULTICAST Record.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A multicast tree switching capability, for switching between multicast trees, is depicted and described herein. The multicast tree switching capability improves the mechanism for switching between multicast trees, such that a stream to stream transition may be executed more quickly than is possible with existing mechanisms for switching between multicast trees. The multicast tree switching capability, by providing a rapid mechanism for switching between multicast streams of the multicast trees, minimizes the impact on end users when switching is performed, e.g., in response to failures (e.g., components, links, and the like), for load sharing, for maintenance, and the like. The multicast tree switching capability, by providing a rapid stream switching mechanism, reduces packet loss and, thus, increases end user quality of experience.

The multicast tree switching capability may be useful within the context of a network in which video traffic is transported via a network redundantly using two multicast trees, where the two multicast trees enter the network at the same or different ingress network nodes and the two multicast trees exit the network via a network egress node (e.g., for forwarding of the video traffic to potential downstream receivers). In this context, the multicast tree switching capability provides a mechanism by which a network egress node, receiving video traffic via two multicast trees, can access the video traffic received over one of the multicast trees (for forwarding to the potential downstream receivers of the video traffic) while rejecting the video traffic received over the other of the multicast trees.

Although primarily depicted and described within the context of broadcast/multicast video delivery systems (namely, within the context of multicast transport of video traffic via an Internet Protocol (IP)/Multiprotocol Label Switching (MPLS) network), the multicast tree switching capability may be implemented within any other type(s) of system(s) in which switching between multicast streams is necessary or desirable (e.g., in other types of video delivery systems using other types of underlying networks and/or protocols, in networks supporting transport of other types of traffic, and the like, as well as various combinations thereof).

Figure 1:
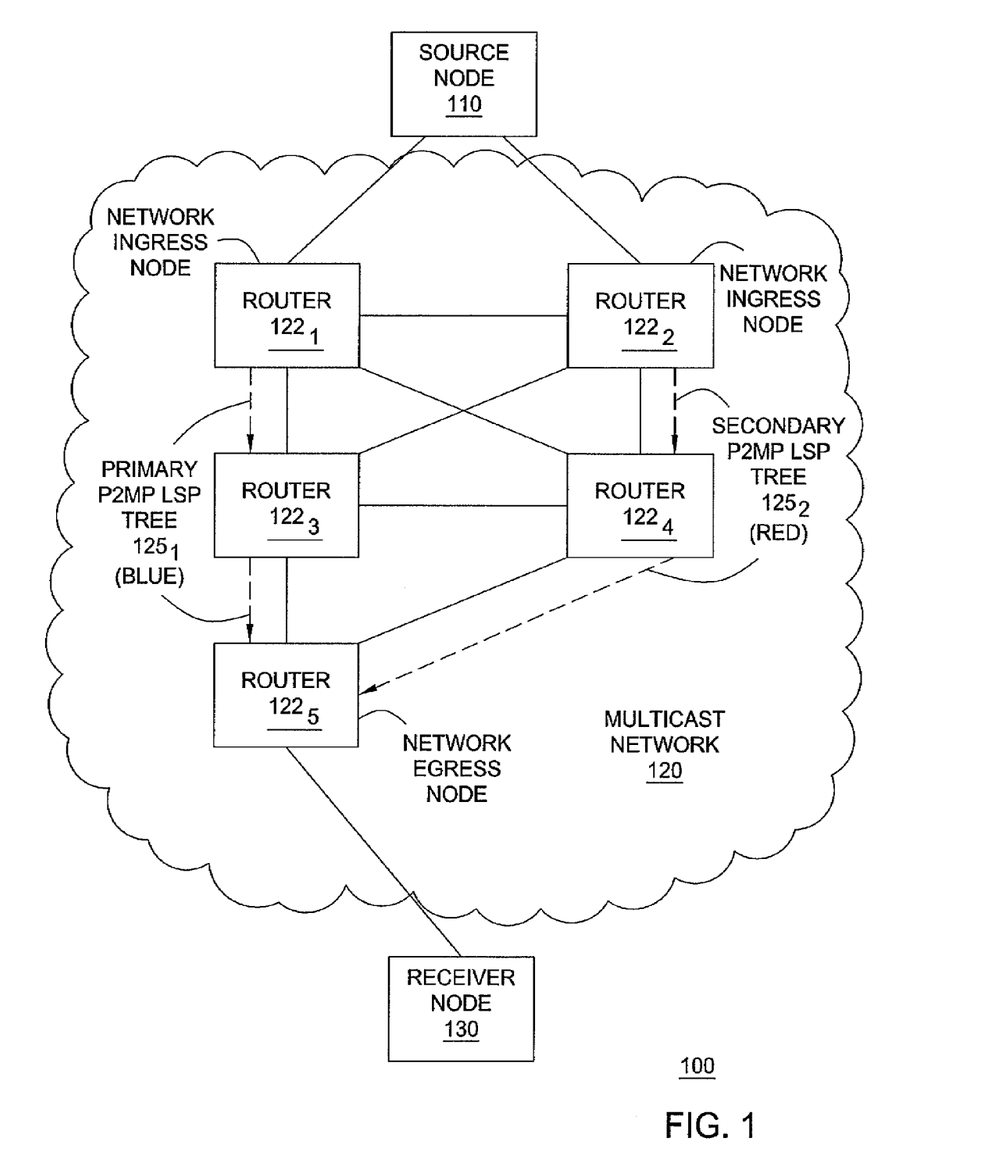
FIG. 1 depicts a high-level block diagram of an exemplary video distribution system including a network egress node configured for switching between multicast trees.

FIG. 1 depicts a high-level block diagram of an exemplary video distribution system including a network egress node configured for switching between multicast trees.

The exemplary video distribution system 100 includes a source node 110, a multicast network 120, and a receiver node 130. The multicast network 120 includes a plurality of routers $122_1$-$122_5$ (collectively, routers 122). The source node 110, routers 122, and receiver node 130 are coupled, and, thus, communicate, via communication links. As depicted in FIG. 1, the source node 110, routers 122, and receiver node 130 are coupled as follows: (a) source node 110 is coupled to routers $122_1$ and $122_2$, (b) routers $122_1$, $122_2$, $122_3$, and $122_4$ are coupled in a full mesh, (c) routers $122_3$ and $122_4$ are both coupled to router $122_5$, and (d) router $122_5$ is coupled to receiver node 130.

The source node 110 distributes video traffic as a video stream (which also may be referred to as a video channel). The source node 110 distributes the video traffic to the multicast network 120 for multicasting of the video traffic to receiver node 130. As depicted in FIG. 1, the source node 110 distributes the video traffic to both routers $122_1$ and $122_2$. The source node 110 may distribute the video traffic in any suitable manner. In one embodiment, for example, source node 110 distributes the video traffic as IP multicast packets using a unique IP multicast address for the video stream of the video traffic. The source node 110 may obtain the video traffic from any suitable source (e.g., locally where the video traffic is stored on source node 110, from one or more other network elements, and the like).

The multicast network 120 receives the video traffic from source node 110 and multicasts the video traffic for delivery to receiver node 130. The multicast network 120 may be any suitable type of network utilizing any suitable multicast capabilities. In one embodiment, for example, multicast network 120 is an IP/MPLS network configured for supporting multicasting of video traffic using Point-to-Multipoint (P2MP) Label Switched Paths (LSPs). The characteristics of P2MP LSPs will be understood by one skilled in the art.

As depicted in FIG. 1, routers $122_1$ and $122_2$ receive the video traffic from source node 110 and multicast the traffic to router $122_5$. The router $122_1$ multicasts the video traffic to router $122_5$ via a primary P2MP LSP tree $125_1$ configured between router $122_1$ and router $122_5$, which traverses the path from router $122_1$ to router $122_3$ to router $122_5$ (which also is referred to herein as the Blue P2MP LSP or P2MP-BLUE). The router $122_2$ multicasts the video traffic to router $122_5$ via a standby P2MP LSP tree $125_2$ configured between router $122_2$ and router $122_5$, which traverses the path from router $122_2$ to router $122_4$ to router $122_5$ (which also is referred to herein as the Red P2MP LSP or P2MP-RED). The primary P2MP LSP tree $125_1$ and standby P2MP LSP tree $125_2$ are referred to collectively herein as P2MP LSP trees 125. The P2MP LSP trees 125 may be configured within multicast network 120 in any suitable manner (e.g., using Resource Reservation Protocol—Traffic Engineering (RSVP-TE) based control plane signaling and/or in any other suitable manner). The routers $122_1$ and $122_2$ operate as network ingress nodes. In general, in this context, a network ingress node is a node at which (1) a P2MP LSP tree originates, and (2) traffic, received from a source node in IP multicast packets, is encapsulated with MPLS labels using MPLS and propagated over the P2MP LSP tree.

As further depicted in FIG. 1, router $122_5$ receives the video traffic from video source 110 via both the primary P2MP LSP tree $125_1$ and the standby P2MP LSP tree $125_2$. The router $122_5$ is configured to accept the video traffic from one of the P2MP LSP trees 125 and discard the video traffic from the other one of the P2MP LSP trees 125 (as such video traffic is redundant to router $122_5$). Namely, router $122_5$ is configured to accept the video traffic from the primary P2MP LSP tree $125_1$ and discard the video traffic from the standby P2MP LSP tree $125_2$ as long as the primary P2MP LSP tree $125_1$ is active and, further, is configured to switch to accepting the video traffic from the standby P2MP LSP tree $125_2$ when the video traffic is no longer available from the primary P2MP LSP tree $125_1$ (e.g., in response to a failure). As described herein, the multicast tree switching capability is adapted to improve the process by which the router $122_5$ switches from receiving the video traffic from the primary P2MP LSP tree $125_1$ to receiving the video traffic from the standby P2MP LSP tree $125_2$. The router $122_5$ operates as a network egress node and, thus, also may be referred to herein as network egress node $122_5$. In general, in this context, a network egress node is a node at which (1) a P2MP LSP tree terminates, and (2) MPLS label encapsulation is removed and traffic, as IP multicast packets, is propagated on one or more local outgoing interfaces to potential receivers of the traffic channel (illustratively, receiver node 130).

From the foregoing description of exemplary video distribution system 100, it will be appreciated that the multicast tree switching capability is at least applicable within the context of any broadcast/multicast video delivery system supporting multiple channels over an IP/MPLS network cloud, where the video traffic is MPLS-encapsulated by the network ingress node and propagated via a Multicast P2MP LSP Tree to the network egress node(s). In many such applications, the network egress nodes receive the video traffic from two different network ingress nodes via P2MP LSP trees originating from the network ingress nodes, respectively. Similarly, in many such applications, each network egress node may choose to receive different channels from either of the P2MP LSP trees available to the network egress node. This type of redundancy is typically employed in order to minimize loss when a failure occurs in a primary P2MP LSP tree (i.e., via quick switchover to a standby P2MP LSP tree associated with the primary P2MP LSP tree). In many such applications (e.g., delivery of video traffic), it is desirable to have traffic loss for less than one second when such P2MP LSP tree failures occur.

The network egress node $122_5$ is configured to perform multicast tree switching for switching between multicast streams transported by the P2MP LSP trees 125. Namely, the network egress node $122_5$ is configured to switch from the primary P2MP LSP tree $125_1$ to the standby P2MP tree $125_2$ in response to detection of a failure of the primary P2MP LSP tree $125_1$ and, similarly, may be configured to switch back from the standby P2MP LSP tree $125_2$ to the primary P2MP LSP tree $125_1$ in response to detection of restoration of the primary P2MP LSP tree $125_1$.

The network egress node $122_5$ includes a forwarding engine configured to enable multicast tree switching for switching between the P2MP LSP trees 125 and, thus, for switching between multicast streams transported by the P2MP LSP trees 125. The forwarding engine maintains data structures configured for use in enabling multicast tree switching for switching between multicast streams transported by the P2MP LSP trees 125. The use of the data structures for switching between multicast streams transported by the P2MP LSP trees 125 may be better understood by way of reference to FIG. 2.

Figure 2:
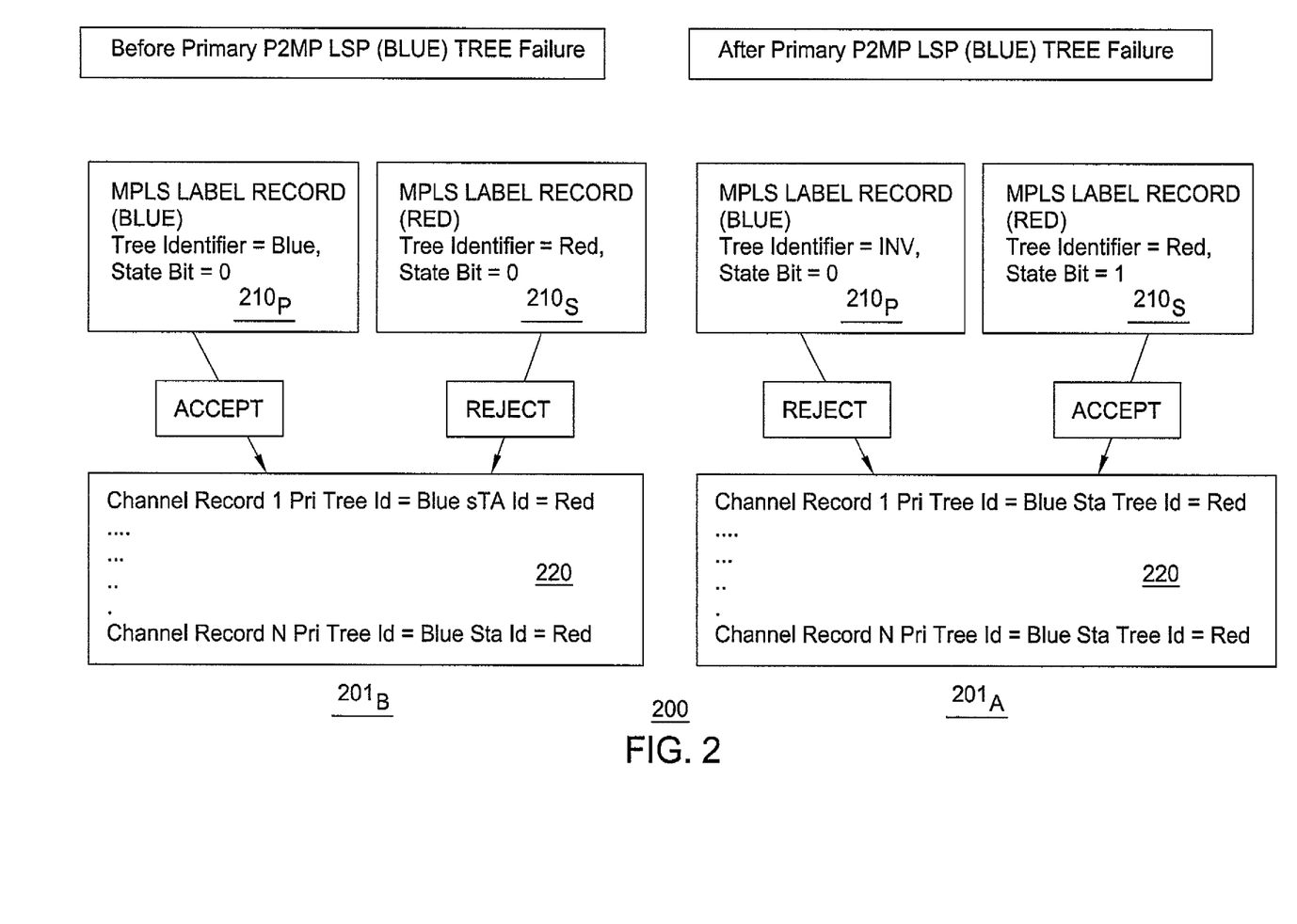
FIG. 2 depicts exemplary data structures of the network egress node of the exemplary video distribution system of FIG. 1.

FIG. 2 depicts exemplary data structures of the network egress node of the exemplary video distribution system of FIG. 1. FIG. 2 depicts (1) a first state $201_B$ of the data structures before failure of the primary P2MP LSP tree $125_1$ is detected at network egress node $122_5$ and (2) a second state $201_A$ of the data structures after the failure of the primary P2MP LSP tree $125_1$ is detected at network egress node $122_5$.

As depicted in FIG. 2, the data structures include a first MPLS LABEL Record $210_P$ for the primary P2MP LSP tree $125_1$ and a second MPLS LABEL Record $210_S$ for the standby P2MP LSP tree $125_2$ (collectively, MPLS LABEL Records 210), and a MULTICAST Record 220.

The MPLS LABEL Records $210_P$ and $210_S$ (which also may be referred to as Incoming Label Map (ILM) Tables) are lookup tables used for MPLS label-encapsulated packets that are received via the primary and standby P2MP LSP trees $125_1$ and $125_2$, respectively. The MPLS LABEL Records 210 are unique for each P2MP LSP tree 125. The MPLS LABEL Records 210 each include a tree identifier (which identifies the P2MP LSP tree 125 of the MPLS LABEL Record 210). The MPLS LABEL Records 210 also each include a new parameter referred to herein as a State Bit, which enables multicast tree switching in accordance with the multicast tree switching capability. As described herein, in one embodiment, rapid switchover from the primary P2MP LSP tree $125_1$ to the standby P2MP LSP tree $125_2$ upon failure of the primary P2MP LSP tree $125_1$ is achieved via reprogramming of the MPLS LABEL Record $210_S$ of the standby P2MP LSP tree $125_2$ (and, optionally, via reprogramming of the MPLS LABEL Record $210_P$ of the primary P2MP LSP tree $125_1$).

The MULTICAST Record 220 (which also may be referred to as an SG Table) is a lookup table used for the MPLS label-encapsulated packets that are received via P2MP LSP trees 125. The MULTICAST Record 220 includes, for each multicast channel, a multicast channel record including a primary tree identifier (indicative of the tree identifier of the P2MP LSP tree 125 that is currently set as the active tree) and a standby tree identifier (indicative of the tree identifier of the P2MP LSP tree 125 that is currently set as the standby tree). The MULTICAST Record 220 is used to perform lookups, for packets that are received via P2MP LSP trees 125, based on the source and the multicast address.

The MPLS LABEL Records 210 and MULTICAST Record 220 are used for processing received packets, e.g., for determining whether to accept or discard received packets. In general, when a multicast packet is received at the network egress node $122_5$, the packet that comes from the wire includes the information to be transported (e.g., video) within an IP packet which is encapsulated with an MPLS Header (which includes an MPLS Label), which is further encapsulated with an Ethernet Header. When the multicast packet is received, the Ethernet Header is removed and the MPLS Label from the MPLS header of the packet is used to identify which of the MPLS LABEL Records 210 should be used for processing the packet (e.g., using a lookup operation or in any other suitable manner). The tree identifier of the identified MPLS LABEL Record is then used as the tree identifier to be compared with information in the MULTICAST Record for determining whether the packet is to be accepted or discarded.

As depicted in FIG. 2, at first state $201_B$, MPLS LABEL Record $210_P$ associated with primary P2MP LSP tree $125_1$ has a tree identifier of BLUE and a State Bit set to 0, MPLS LABEL Record $210_S$ associated with standby P2MP LSP tree $125_2$ has a tree identifier of RED and a State Bit set to 0, and MULTICAST Record 220 includes N entries where each entry has a primary tree identifier set to BLUE and a standby tree identifier set to RED. In other words, before failure of the primary P2MP LSP tree $125_1$, the default value of the State Bits of each of the MPLS LABEL Records 220 is 0. The forwarding engine of the network egress node $122_5$ is configured such that, when the value of the State Bit of either MPLS LABEL Record 210 is set to 0 and a packet is received over one of the P2MP LSP trees 125, the forwarding engine compares only the primary tree identifiers of the MULTICAST Record 220 to the tree identifier retrieved from the MPLS LABEL Record 210 of the P2MP LSP tree 125 via which the packet is received. As a result, as depicted in state $201_B$ of FIG. 2, before failure of the primary P2MP LSP tree $125_1$ only packets received via the primary P2MP LSP tree $125_1$ will be accepted and forwarded, while packets received via the standby P2MP LSP tree $125_2$ will be discarded.

In first state $201_B$, when a packet is received via primary P2MP LSP tree $125_1$, the tree identifier BLUE is retrieved from the MPLS LABEL Record $210_P$ associated with the primary P2MP LSP tree $125_1$ and, due to the State Bit value being 0, is compared only to the primary tree identifiers in the MULTICAST Record 220. In this case, since all of the primary tree identifiers in the MULTICAST Record 220 have values of BLUE, a match will be found and, thus, packets received via the primary P2MP LSP tree $125_1$ will be accepted and forwarded.

In first state $201_B$, when a packet is received via standby P2MP LSP tree $125_2$, the tree identifier RED is retrieved from the MPLS LABEL Record $210_P$ associated with the primary P2MP LSP tree $125_1$ and, due to the State Bit value being 0, is compared only to the primary tree identifiers in the MULTICAST Record 220. In this case, since all of the primary tree identifiers in the MULTICAST Record 220 have values of BLUE, a match will not be found and, thus, packets received via the standby P2MP LSP tree $125_2$ will be discarded.

As depicted in FIG. 2, at second state $201_A$, upon detection of failure of the primary P2MP LSP tree $125_1$: (1) the State Bit of the MPLS LABEL Record $210_S$ of the standby P2MP LSP tree $125_2$ is switched from 0 to 1, and (2) the tree identifier value of the MPLS LABEL Record $210_P$ of the failed primary P2MP LSP tree $125_1$ is set to an invalid value in order to prevent duplication of packets by the network egress node $122_5$ (i.e., to prevent a situation where the network egress node $122_5$ accepts packets from both of the P2MP LSP trees 125). As a result, at second state $201_A$, the MPLS LABEL Record $210_P$ associated with primary P2MP LSP tree $125_1$ has a tree identifier of INV and a State Bit set to 0, MPLS LABEL Record $210_S$ associated with standby P2MP LSP tree $125_2$ has a tree identifier of RED and a State Bit set to 1, and MULTICAST Record 220 includes N entries where each entry has a primary tree identifier set to BLUE and a standby tree identifier set to RED (i.e., the MULTICAST Record 220 has not yet been modified, as would be required in existing multicast tree switching implementations before traffic could be accepted via the standby P2MP LSP tree $125_2$). The forwarding engine of the network egress node $122_5$ is configured such that, when the State Bit of the MPLS LABEL Record $210_S$ of the standby P2MP LSP tree $125_2$ is set to 1, the forwarding engine considers matching both the primary and standby tree identifiers of the MULTICAST Record 220 with the tree identifier retrieved from the MPLS LABEL Record 210 of the P2MP LSP tree 125 via which the packet is received and, if either of the compared values matches, the packet is accepted and forwarded.

In second state $201_A$, when a packet is received via primary P2MP LSP tree $125_1$, the tree identifier INV is retrieved from the MPLS LABEL Record $210_P$ associated with the primary P2MP LSP tree $125_1$, and is compared to the primary tree identifier in the MULTICAST Record 220. Since all of the primary tree identifiers in the MULTICAST Record 220 have values of BLUE, a match cannot be found and, thus, packets received via the primary P2MP LSP tree $125_1$ will be discarded. It will be appreciated that, while this may not be an issue when the primary P2MP LSP tree $125_1$ is in a failure state, this will prevent duplication of packets during the time between when the primary P2MP LSP tree $125_1$ is restored and a switchback operation is performed for switching back to using the primary P2MP LSP tree $125_1$.

In second state $201_A$, when a packet is received via standby P2MP LSP tree $125_2$, the tree identifier RED is retrieved from the MPLS LABEL Record $210_P$ associated with the primary P2MP LSP tree $125_1$ and, due to the State Bit value being 1, is compared to both the primary tree identifier in the MULTICAST Record 220 and the standby tree identifier in the MULTICAST Record 220. In this case, even though all of the primary tree identifiers in the MULTICAST Record 220 are BLUE (since the MULTICAST Record 220 has not been reprogrammed), the packets received via the standby P2MP LSP tree $125_2$ still will be accepted and forwarded by the forwarding engine since all of the standby tree identifiers in the MULTICAST Record 220 are RED (i.e., a match will be found on the standby tree identifiers of MULTICAST Record 220).

In this manner, inclusion of the State Bit within the MPLS LABEL Records 210 allows the forwarding engine of the network egress node $122_5$ to start accepting traffic from the standby P2MP LSP tree $125_2$ in response to detection of failure of the primary P2MP LSP tree $125_1$ before reprogramming of the MULTICAST Record 220 is performed.

It will be appreciated that the operation of reprogramming the MPLS LABEL Records 210 in response to tree failure is deterministic and is order O(1) and, therefore, that rapid switchover from the primary P2MP LSP tree $125_1$ to the standby P2MP LSP tree $125_2$ upon failure of the primary P2MP LSP tree $125_1$ is able to be accomplished with little or no traffic loss. This is a substantial improvement over existing multicast tree switching implementations which are order O(N) due to the need to reprogram all N of the channel records of the MULTICAST Record before packets received on the standby P2MP LSP tree may be accepted and forwarded by the network egress node.

The operation of a network egress node in performing multicast tree switching, including reprogramming of the data structures of the forwarding engine for enabling multicast tree switching, may be performed in any suitable manner. The operation of a network egress node in performing multicast tree switching may be better understood by way of reference to the exemplary embodiment of a network egress node as depicted in FIG. 3.

Figure 3:
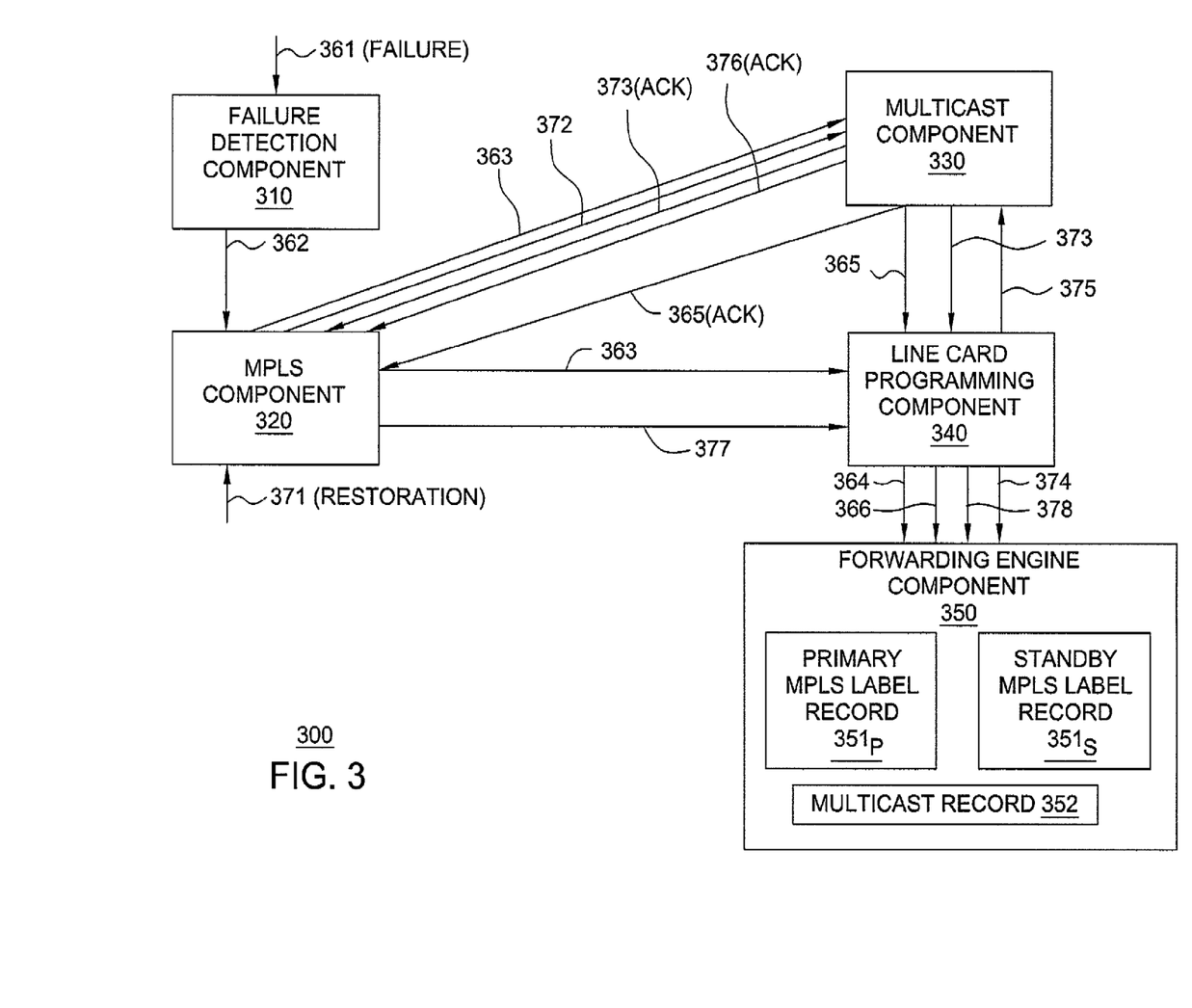
FIG. 3 depicts a high-level block diagram of one embodiment of a network egress node.

FIG. 3 depicts a high-level block diagram of one embodiment of a network egress node. For example, the network egress node 300 of FIG. 3 may be used as router $122_5$ of FIG. 1, which functions as the network egress node for the P2MP LSP trees 125 of FIG. 1.

As depicted in FIG. 3, the network egress node 300 includes a number of components that cooperate to perform multicast tree switching according to the multicast tree switching capability depicted and described herein. Namely, network egress node 300 includes a Failure Detection Component 310, an MPLS Component 320, a Multicast Component 330, a Line Card Programming Component 340, and a Forwarding Engine Component 350. As depicted in FIG. 3, Forwarding Engine Component 350 maintains each of: an MPLS LABEL Record $351_P$ of the primary P2MP LSP tree $125_1$, an MPLS LABEL Record $351_S$ of the standby P2MP LSP tree $125_2$, and a MULTICAST Record 352.

A description of the use of the components of network egress node 300 for providing the multicast tree switching capability follows by way of reference to steps 361-366 (for switching from the failed primary P2MP LSP tree $125_1$ to the standby P2MP LSP tree $125_2$) and steps 371-378 (for switching back from the standby P2MP LSP tree $125_2$ to the restored primary P2MP LSP tree $125_1$).

As described herein, the network egress node 300 is configured to switch from the primary P2MP LSP tree $125_1$ to the standby P2MP LSP tree $125_2$ when failure of the primary P2MP LSP tree $125_1$ is detected. This is depicted and described with respect to steps 361-366.

At step 361, the Failure Detection Component 310 detects failure of the primary P2MP LSP tree $125_1$. The failure of the primary P2MP LSP tree $125_1$ may be detected in any suitable manner.

At step 362, the Failure Detection Component 310 notifies the MPLS Component 320 of the detected failure of the primary P2MP LSP tree $125_1$.

At step 363, the MPLS Component 320 performs two actions, namely it (1) sends a message to the Line Card Programming Component 340 for instructing the Line Card Programming Component 340 to modify the State Bit of the MPLS LABEL Record $351_S$ of the standby P2MP LSP tree $125_2$ (e.g., to change the value of the State Bit from 0 to 1) and for instructing the Line Card Programming Component 340 to modify the tree identifier of the MPLS LABEL Record $351_P$ of the primary P2MP LSP tree $125_1$ (e.g., to change the value of the tree identifier to an invalid value), and (2) sends a message to the Multicast Component 330 for informing the Multicast Component 330 of the detected failure of the primary P2MP LSP tree $125_1$.

At step 364, the Line Card Programming Component 340 modifies the State Bit of the MPLS LABEL Record $351_S$ of the standby P2MP LSP tree $125_2$ on Forwarding Engine Component 350 and modifies the tree identifier of the MPLS LABEL Record $351_P$ of the primary P2MP LSP tree $125_1$ on Forwarding Engine Component 350.

At step 365 (which may be performed at any suitable time), the Multicast Component 330 performs two actions, namely it: (1) sends a reprogramming message to the Line Card Programming Component 340 instructing the Line Card Programming Component 340 to modify the MULTICAST Record 352 by switching the primary tree identifiers and the standby tree identifiers for all channel records in the MULTICAST Record 352, thereby making the tree identifier of the standby P2MP LSP tree $125_2$ the primary tree identifier for all channel records and making the tree identifier of the primary P2MP LSP tree $125_1$ the standby tree identifier for all channel records, and (2) sends an acknowledgment message (ACK) to the MPLS Component 320 indicating that the reprogramming message is queued for processing by the Line Card Programming Component 340.

At step 366, the Line Card Programming Component 340 performs the requested reprogramming of the tree identifiers of the MULTICAST Record 352 of the Forwarding Engine Component 350.

In this manner, the State Bits of the MPLS LABEL Records 351 of the P2MP LSP trees 125 allow proper routing of multicast traffic while the network egress node reprograms all of the tree identifiers of the MULTICAST Record 352, as opposed to in existing multicast tree switching solutions in which the reprogramming of the tree identifiers of the MULTICAST Record 352 would need to be completed before packets may be accepted via the standby P2MP LSP tree $125_2$ after failure of the primary P2MP LSP tree $125_1$ (which may result in significant packet loss and, thus, significant impact to the end users).

As described herein, the network egress node 300 also is configured to switch back from the standby P2MP LSP tree $125_2$ to the primary P2MP LSP tree $125_1$ when restoration of the primary P2MP LSP tree $125_1$ is detected. This is depicted and described with respect to steps 371-378.

At step 371, the MPLS Component 320 detects restoration of the primary P2MP LSP tree $125_1$. The restoration of the primary P2MP LSP tree $125_1$ may be detected in any suitable manner. In one embodiment, for example, the failed primary P2MP LSP tree $125_1$ is restored via the MPLS/RSVP-TE protocol mechanism. In one embodiment, the network egress node may wait for a predetermined length of time before taking any action to switch back to using the primary P2MP LSP tree $125_1$.

At step 372, the MPLS Component 320 sends a message to the Multicast Component 330 for informing the Multicast Component 330 of the detected restoration of the primary P2MP LSP tree $125_1$.

At step 373, the Multicast Component 330 performs two actions, namely it: (1) sends a reprogramming message to the Line Card Programming Component 340 instructing the Line Card Programming Component 340 to modify the MULTICAST Record 352 by switching the primary tree identifiers and the standby tree identifiers for all channel records in the MULTICAST Record 352, thereby making the tree identifier of the primary P2MP LSP tree $125_1$ the primary tree identifier for all channel records and making the tree identifier of the standby P2MP LSP tree $125_2$ the standby tree identifier for all channel records, and (2) sends an acknowledgment message (ACK) to the MPLS Component 320 indicating that the reprogramming message is queued for processing by the Line Card Programming Component 340.

At step 374, the Line Card Programming Component 340 performs the requested reprogramming of the tree identifiers of the MULTICAST Record 352 of the Forwarding Engine Component 350.

At step 375, following completion of the requested reprogramming of the tree identifiers of the MULTICAST Record 352 of the Forwarding Engine Component 350, the Line Card Programming Component 340 sends an acknowledgement message to the Multicast Component 330 indicating that reprogramming of the MULTICAST Record 352 of the Forwarding Engine Component 350 is complete. In an alternative embodiment, the Line Card Programming Component 340 may send the acknowledgement message directly to MPLS Component 320.

At step 376, the Multicast Component 330 sends an acknowledgement message to the MPLS Component 320 indicating that reprogramming of the MULTICAST Record 352 of the Forwarding Engine Component 350 is complete.

At step 377, the MPLS Component 320 sends a programming message to the Line Card Programming Component 340 instructing the Line Card Programming Component 340 to (1) correct the tree identifier of the MPLS LABEL Record $351_P$ of the primary P2MP LSP tree $125_1$ (e.g., from the invalid value to the correct tree identifier of primary P2MP LSP tree $125_1$) and (2) reset the State Bit of the MPLS LABEL Record $351_S$ of the standby P2MP LSP tree $125_2$ (e.g., to change the value of the State Bit from 1 back to 0).

At step 378, the Line Card Programming Component 340 modifies the tree identifier of the MPLS LABEL Record $351_P$ of the primary P2MP LSP tree $125_1$ on the Forwarding Engine Component 350 and modifies the State Bit of the MPLS LABEL Record $351_S$ of the standby P2MP LSP tree $125_2$ on the Forwarding Engine Component 350.

In this manner, a smooth and lossless reversion from receiving traffic via the standby P2MP LSP tree $125_2$ to receiving traffic via the primary P2MP LSP tree $125_1$ may be achieved. It will be appreciated that, when the standby P2MP LSP tree $125_2$ is active during reversion to the primary P2MP LSP tree $125_1$, there is no need to change the State Bit of the MPLS LABEL Record $351_P$ of the primary P2MP LSP tree $125_1$ from 0 to 1 because traffic can be received via the standby P2MP LSP tree $125_2$ while reprogramming of the MULTICAST Record 352 is performed.

Although depicted and described as separate components, it will be appreciated that the various components of network egress node 300 may be implemented in any suitable manner (e.g., as separate physical components, as one or more logical portions of one or more physical components, and the like, as well as various combinations thereof).

Figure 4:
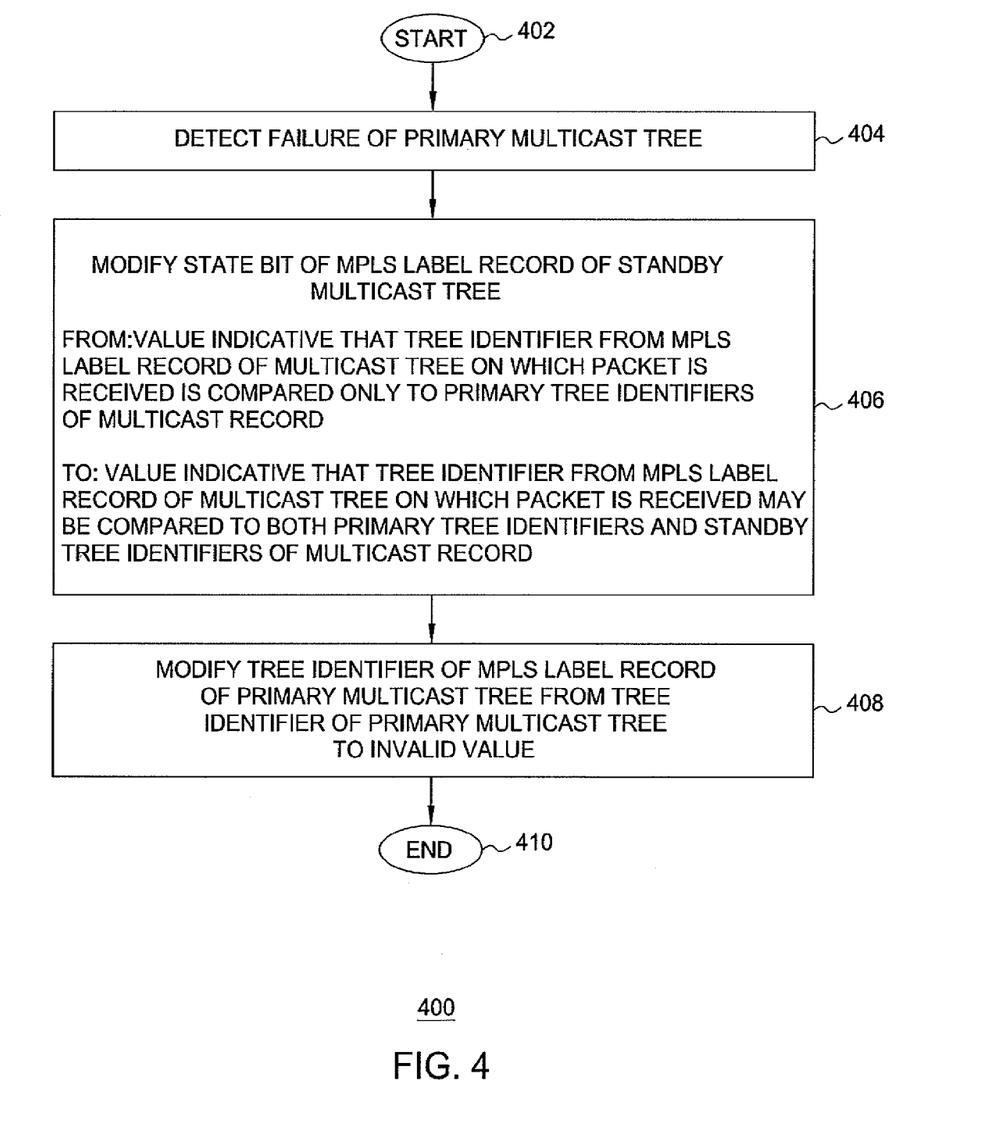
FIG. 4 depicts one embodiment of a method for configuring a network egress node to switch from a primary multicast tree to a standby multicast tree.

FIG. 4 depicts one embodiment of a method for configuring a network egress node to switch from a primary multicast tree to a standby multicast tree.

At step 402, method 400 begins.

At step 404, failure of the primary multicast tree is detected.

At step 406, the MPLS LABEL Record of the standby multicast tree is modified. Namely, the State Bit of the MPLS LABEL Record is changed from a first value (a value indicative to the network egress node that the tree identifier of the MPLS LABEL record of the standby multicast tree is to be compared only to the primary tree identifiers of the MULTICAST Record of the network egress node when determining whether to accept/forward packets or to discard packets) to a second value (a value indicative to the network egress node that the tree identifier of the MPLS LABEL record of the standby multicast tree may be compared to both the primary tree identifiers and the standby tree identifiers of the MULTICAST Record of the network egress node when determining whether to accept/forward packets or to discard packets).

At step 408, the MPLS LABEL Record of the primary multicast tree is modified. Namely, the tree identifier of the MPLS LABEL Record is changed from a first value (the tree identifier of the primary multicast tree) to a second value (an invalid value).

At step 410, method 400 ends. Although depicted and described as ending (since execution of this method is sufficient to enable traffic to be received via the standby multicast tree), it will be appreciated that additional steps may be performed on the network egress node (e.g., reprogramming the primary and standby tree identifiers of the MULTICAST Record).

Figure 5:
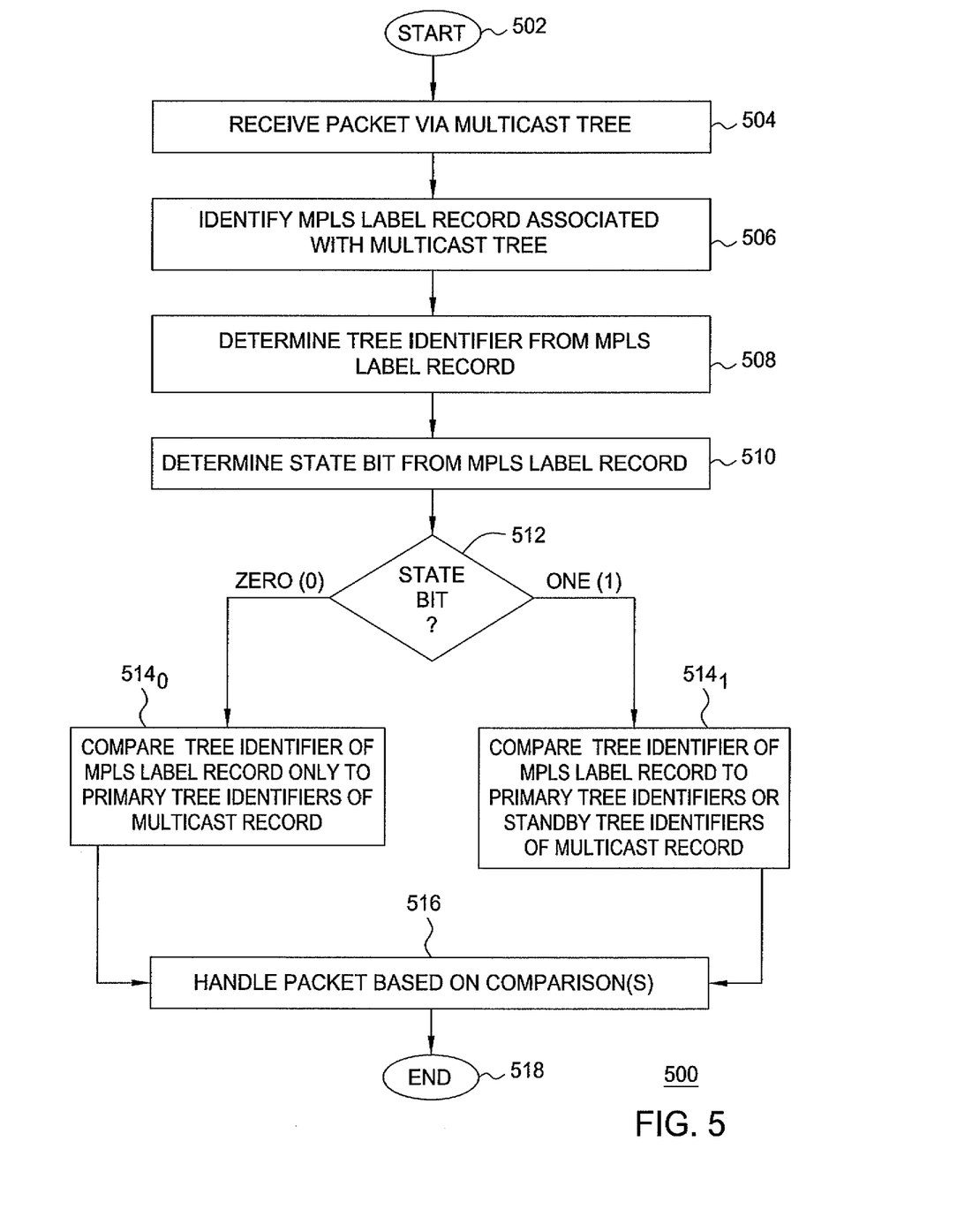
FIG. 5 depicts one embodiment of a method accepting packets from a standby multicast tree after failure of a primary multicast tree.

FIG. 5 depicts one embodiment of a method accepting packets from a standby multicast tree after failure of a primary multicast tree. The method 500 may be executed for packets received on either a primary multicast tree or a standby multicast tree.

At step 502, method 500 begins.

At step 504, a packet is received via a multicast tree.

At step 506, the MPLS LABEL Record associated with the multicast tree is identified. For example, the MPLS LABEL Record may be identified using the MPLS Label in the MPLS Header of the packet.

At step 508, the tree identifier is determined from the MPLS LABEL Record.

At step 510, the State Bit is determined from the MPLS LABEL Record.

At step 512, a determination is made as to whether the State Bit of the MPLS LABEL Record is zero (0) or one (1). If the State Bit is zero, method 500 proceeds to step $514_0$. If the State Bit is one, method 500 proceeds to step $514_1$.

At step $514_0$, a first packet processing rule is applied for determining handling of the received packet. Namely, the tree identifier of the MPLS LABEL Record is compared only to the primary tree identifiers of the MULTICAST Record for determining whether the packet is accepted or discarded.

At step $514_1$, a second packet processing rule is applied for determining handling of the received packet. Namely, the tree identifier of the MPLS LABEL Record may be compared to both the primary tree identifiers and the standby tree identifiers of the MULTICAST Record for determining whether the packet is accepted or discarded.

At step 516, the packet is handled based on the comparison(s), namely, the packet is accepted for forwarding (where a match is found) or discarded (where no match is found).

At step 518, method 500 ends.

Although depicted and described herein with respect to embodiments in which the default value of the State Bit of the MPLS LABEL Record is "0" and the State Bit is set to "1" in the MPLS LABEL Record of the standby P2MP LSP tree upon detection of failure of the primary P2MP LSP tree, it will be appreciated that in other embodiments the default value of the State Bit of the MPLS LABEL Record is "1" and the State Bit is set to "0" in the MPLS LABEL Record of the standby P2MP LSP tree upon detection of failure of the primary P2MP LSP tree.

Although primarily depicted and described herein with respect to embodiments in which the multicast tree switching capability is provided using a parameter, referred to as a State Bit, having a one-bit value, it will be appreciated that any suitable parameter or combination of parameters may be used for providing the multicast tree switching capability (e.g., using a single-bit value having a different parameter name, using multi-bit values, using any other suitable values, and the like, as well as various combinations thereof). In other words, any suitable parameter(s) and associated parameter value(s) may be used for providing the various capabilities enabled by the State Bit depicted and described herein.

Although primarily depicted and described herein with respect to embodiments in which the multicast tree switching capability is used for switching between P2MP LSP trees, the multicast tree switching capability may be used for switching between various other types of multicast trees.

Although primarily depicted and described herein with respect to embodiments in which the multicast tree switching capability is used for switching between multicast trees in an MPLS network, the multicast tree switching capability may be used for switching between multicast trees in other types of multicast networks.

Figure 6:
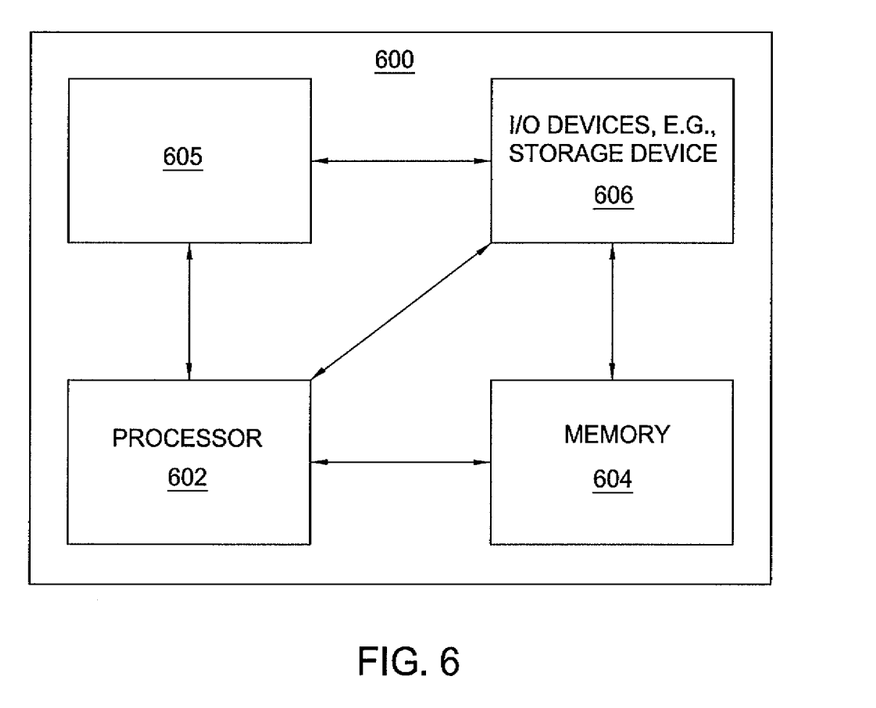
FIG. 6 depicts a high-level block diagram of a computer suitable for use in performing the functions described herein.

FIG. 6 depicts a high-level block diagram of a computer suitable for use in performing functions described herein.

As depicted in FIG. 6, computer 600 includes a processor element 602 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 605 can be loaded into memory 604 and executed by processor 602 to implement the functions as discussed herein. Thus, cooperating process 605 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal-bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for enabling switchover from a first multicast tree to a second multicast tree at a node, the method comprising:
   detecting a failure of the first multicast tree at the node, the node comprising:
      a first MPLS LABEL Record comprising a first tree identifier of the first multicast tree and a first parameter;
      a second MPLS LABEL Record comprising a second tree identifier of the second multicast tree and a second parameter; and
      a MULTICAST Record comprising a plurality of primary tree identifiers and a plurality of standby tree identifiers; and
   switching the second parameter of the second MPLS LABEL Record from a first value to a second value based on detection of the failure of the first multicast tree, the first and second values indicative of respective first and second packet processing rules to be applied for determining whether to accept or discard packets received at the node via the second multicast tree, wherein the first packet processing rule is indicative that the second tree identifier of the second MPLS LABEL Record is to be compared to the primary tree identifiers of the MULTICAST Record and the second packet processing rule is indicative that the second tree identifier of the second MPLS LABEL Record is to be compared to the primary tree identifiers and the secondary tree identifiers of the MULTICAST Record.

2. The method of claim 1, further comprising:
   applying the second packet processing rule to a packet received via the second multicast tree.

3. The method of claim 1, wherein the first packet processing rule associated with the first value is indicative that a received packet is to be accepted only if the second tree identifier of the second MPLS LABEL Record matches one of the primary tree identifiers of the MULTICAST Record.

4. The method of claim 1, wherein the second packet processing rule associated with the second value is indicative that the received packet is to be accepted if the second tree identifier of the second MPLS LABEL Record matches one of the primary tree identifiers or one of the standby tree identifiers of the MULTICAST Record.

5. The method of claim 1, further comprising:
receiving a packet via the second multicast tree;
determining the second tree identifier of the second multicast tree from the second MPLS LABEL Record; and
applying the second packet processing rule based on a determination that the second parameter of the second MPLS LABEL Record has the second value.

6. The method of claim 1, further comprising:
replacing the first tree identifier of the first MPLS LABEL Record with an invalid value.

7. The method of claim 6, further comprising:
replacing the invalid value of the first MPLS LABEL Record with the first tree identifier of the first multicast tree based on a determination that the first multicast tree is restored.

8. The method of claim 1, further comprising:
modifying the MULTICAST Record by switching each of the primary tree identifiers to point to the second tree identifier of the second multicast tree and switching each of the standby tree identifiers to point to the first tree identifier of the first multicast tree.

9. The method of claim 8, further comprising:
based on a determination that the first multicast tree is restored:
modifying the MULTICAST Record by switching each of the primary tree identifiers to point to the first tree identifier of the first multicast tree and switching each of the standby tree identifiers to point to the second tree identifier of the second multicast tree; and
switching the second parameter of the second MPLS LABEL Record from the second value to the first value.

10. The method of claim 1, wherein the first and second multicast trees are Point-to-Multipoint (P2MP) Label Switched Path (LSP) trees.

11. An apparatus, comprising:
a memory comprising:
a first MPLS LABEL Record comprising a first tree identifier of the first multicast tree and a first parameter;
a second MPLS LABEL Record comprising a second tree identifier of the second multicast tree and a second parameter; and
a MULTICAST Record comprising a plurality of primary tree identifiers and a plurality of standby tree identifiers; and
a processor communicatively connected to the memory, the processor configured to:
detect a failure of the first multicast tree; and
switch the second parameter of the second MPLS LABEL Record from a first value to a second value based on detection of the failure of the first multicast tree, the first and second values indicative of respective first and second packet processing rules to be applied for determining whether to accept or discard packets received via the second multicast tree, wherein the first packet processing rule is indicative that the second tree identifier of the second MPLS LABEL Record is to be compared to the primary tree identifiers of the MULTICAST Record and the second packet processing rule is indicative that the second tree identifier of the second MPLS LABEL Record is to be compared to the primary tree identifiers and the secondary tree identifiers of the MULTICAST Record.

12. A method, comprising:
receiving a packet at a node supporting a first multicast tree and a second multicast tree, wherein the node comprises:
a first MPLS LABEL Record comprising a first tree identifier of the first multicast tree and a first parameter;
a second MPLS LABEL Record comprising a second tree identifier of the second multicast tree and a second parameter; and
a MULTICAST Record comprising a plurality of primary tree identifiers and a plurality of standby tree identifiers;
determining a value of the first parameter of the first MPLS LABEL Record of the first multicast tree based on a determination that the packet is received via the first multicast tree; and
determining, based on the value of first parameter of the first MPLS RECORD LABEL, whether to apply a first packet processing rule or a second packet processing rule for determining whether to accept or discard the packet at the node, wherein the first packet processing rule is indicative that the first tree identifier of the first MPLS LABEL Record is to be compared to the primary tree identifiers of the MULTICAST Record and the second packet processing rule is indicative that the first tree identifier of the first MPLS LABEL Record is to be compared to the primary tree identifiers and the secondary tree identifiers of the MULTICAST Record.

13. The method of claim 12, further comprising:
applying the first packet processing rule for determining whether to accept or discard the packet based on a determination that the value of the first parameter is a first value; or
applying the second packet processing rule for determining whether to accept or discard the packet based on a determination that the value of the first parameter is a second value.

14. The method of claim 12, further comprising:
applying the first packet processing rule.

15. The method claim 14, further comprising:
accepting the packet based on a determination that the first tree identifier of the first MPLS LABEL Record of the first multicast tree matches one of the primary tree identifiers of the MULTICAST Record; or
discarding the packet based on a determination that the first tree identifier of the first MPLS LABEL Record of the first multicast tree does not match any of the primary tree identifiers of the MULTICAST Record.

16. The method of claim 12, further comprising:
applying the second packet processing rule.

17. The method claim 16, further comprising:
- accepting the packet based on a determination that the first tree identifier of the first MPLS LABEL Record of the first multicast tree matches one of the primary tree identifiers of the MULTICAST Record or matches one of the standby tree identifiers of the MULTICAST Record; or
- discarding the packet based on a determination that the first tree identifier of the first MPLS LABEL Record of the first multicast tree does not match any of the primary tree identifiers or the standby tree identifiers of the MULTICAST Record.

18. An apparatus configured to support a first multicast tree and a second multicast tree, the apparatus comprising:
- a memory comprising:
  - a first MPLS LABEL Record comprising a first tree identifier of the first multicast tree and a first parameter;
  - a second MPLS LABEL Record comprising a second tree identifier of the second multicast tree and a second parameter; and
  - a MULTICAST Record comprising a plurality of primary tree identifiers and a plurality of standby tree identifiers; and
- a processor communicatively connected to the memory, the processor configured to:
  - receive a packet via the first multicast tree;
  - determine a value of the first parameter of the first MPLS LABEL Record of the first multicast tree based on a determination that the packet is received via the first multicast tree; and
  - determine, based on the value of first parameter of the first MPLS RECORD LABEL, whether to apply a first packet processing rule or a second packet processing rule for determining whether to accept or discard the received packet, wherein the first packet processing rule is indicative that the first tree identifier of the first MPLS LABEL Record is to be compared to the primary tree identifiers of the MULTICAST Record and the second packet processing rule is indicative that the first tree identifier of the first MPLS LABEL Record is to be compared to the primary tree identifiers and the secondary tree identifiers of the MULTICAST Record.

* * * * *